(12) United States Patent
Peng et al.

(10) Patent No.: US 11,803,947 B2
(45) Date of Patent: Oct. 31, 2023

(54) BRIGHTNESS AND CONTRAST ENHANCEMENT FOR VIDEO

(71) Applicant: INTEL CORPORATION, Santa Clara, CA (US)

(72) Inventors: Ya-Ti Peng, Sunnyvale, CA (US); Yi-Jen Chiu, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 712 days.

(21) Appl. No.: 16/822,961

(22) Filed: Mar. 18, 2020

(65) Prior Publication Data

US 2020/0219238 A1  Jul. 9, 2020

(51) Int. Cl.
    *G06T 5/00*   (2006.01)
    *G06T 5/40*   (2006.01)
    *H04N 9/64*   (2023.01)
    *G06T 7/136*  (2017.01)

(52) U.S. Cl.
    CPC ............. *G06T 5/008* (2013.01); *G06T 5/40* (2013.01); *G06T 7/136* (2017.01); *H04N 9/646* (2013.01); *G06T 2207/10024* (2013.01); *G06T 2207/20208* (2013.01)

(58) Field of Classification Search
    CPC ........... G06T 5/008; G06T 5/40; G06T 7/136; G06T 2207/10024; G06T 2207/20208; G06T 2207/20008; G06T 2207/20012; G06T 5/007; H04N 9/646; H04N 9/68
    See application file for complete search history.

(56) References Cited

U.S. PATENT DOCUMENTS

| | | | | |
|---|---|---|---|---|
| 8,378,956 | B2 * | 2/2013 | Kerofsky | G09G 3/3426 345/208 |
| 2005/0226526 | A1 * | 10/2005 | Mitsunaga | H04N 9/68 348/E5.073 |
| 2012/0328186 | A1 * | 12/2012 | Roux | G06T 5/40 348/241 |
| 2013/0083248 | A1 * | 4/2013 | Suzuki | G06T 5/007 348/E5.115 |
| 2015/0110399 | A1 * | 4/2015 | Valdes Lopez | G06T 5/40 382/167 |
| 2015/0181186 | A1 * | 6/2015 | Lim | G06T 5/008 348/712 |

(Continued)

OTHER PUBLICATIONS

Intel Corporation: "Localized Adaptive Contrast Enhancement (LACE)", Graphics Driver—Technical White Paper, Sep. 2018, Revision 1.0, 12 pages.

*Primary Examiner* — Molly Wilburn
(74) *Attorney, Agent, or Firm* — HANLEY, FLIGHT & ZIMMERMAN, LLC (57) ABSTRACT

Methods and systems to improve a visual perception of dark scenes in video. An example device includes one or more processors to receive a frame of video segmented into a plurality of sub-regions. A local luminance histogram is generated for each sub-region. A global luminance histogram is generated for the entire frame of video and a global tone mapping curve is generated based on the global luminance histogram. A tone mapping LUT is generated for each sub-region based on the global tone mapping curve and the corresponding local luminance histogram for the sub-region. The frame of video is then modified using the tone mapping LUTs generated for each sub-region and sent to an output device.

25 Claims, 4 Drawing Sheets

(56) References Cited

U.S. PATENT DOCUMENTS

| | | | |
|---|---|---|---|
| 2016/0070974 A1* | 3/2016 | Bai | G06T 5/40 |
| | | | 382/169 |
| 2016/0232419 A1* | 8/2016 | Bai | G06T 5/40 |
| 2018/0097992 A1* | 4/2018 | Douady-Pleven | H04N 23/80 |

* cited by examiner

BRIGHTNESS AND CONTRAST ENHANCEMENT FOR VIDEO

BACKGROUND

The human eye, through adaptation of the iris and other methods, adjusts constantly to adapt to a broad range of luminance present in the environment. The brain continuously interprets this information so that a viewer can see in a wide range of light conditions. Video reproduction devices tend to be more limited in the ability to accurately reproduce images as they would otherwise be seen by the human eye. For example, dark scenes in video tend to obscure image details due to low luminance levels and poor contrast.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The present disclosure describes techniques for enhancing video to improve visual perception of dark scenes by increasing the overall brightness of videos with dark scenes while improving the contrast and maintaining the color vividness of the videos. Existing techniques for improving the brightness of video content commonly result in loss of contrast and loss of color vividness. The techniques presented herein increase the overall brightness perception of the dark scene content while enhancing the local contrast and preserving the color vividness.

To enhance the visual perception of dark video frames, each frame of video content may be processed using a global tone mapping function in combination with a Local Adaptive Contrast Enhancement (LACE) for adjusting the luminance values of the input signals in one step. After the luminance values have been adjusted, a color adjustment process is used to compensate for the color wash-out side effect often produced by luminance enhancement. The process increases the overall brightness perception of the dark scene content while enhancing the local contrast and preserving the color vividness.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Figure 1:
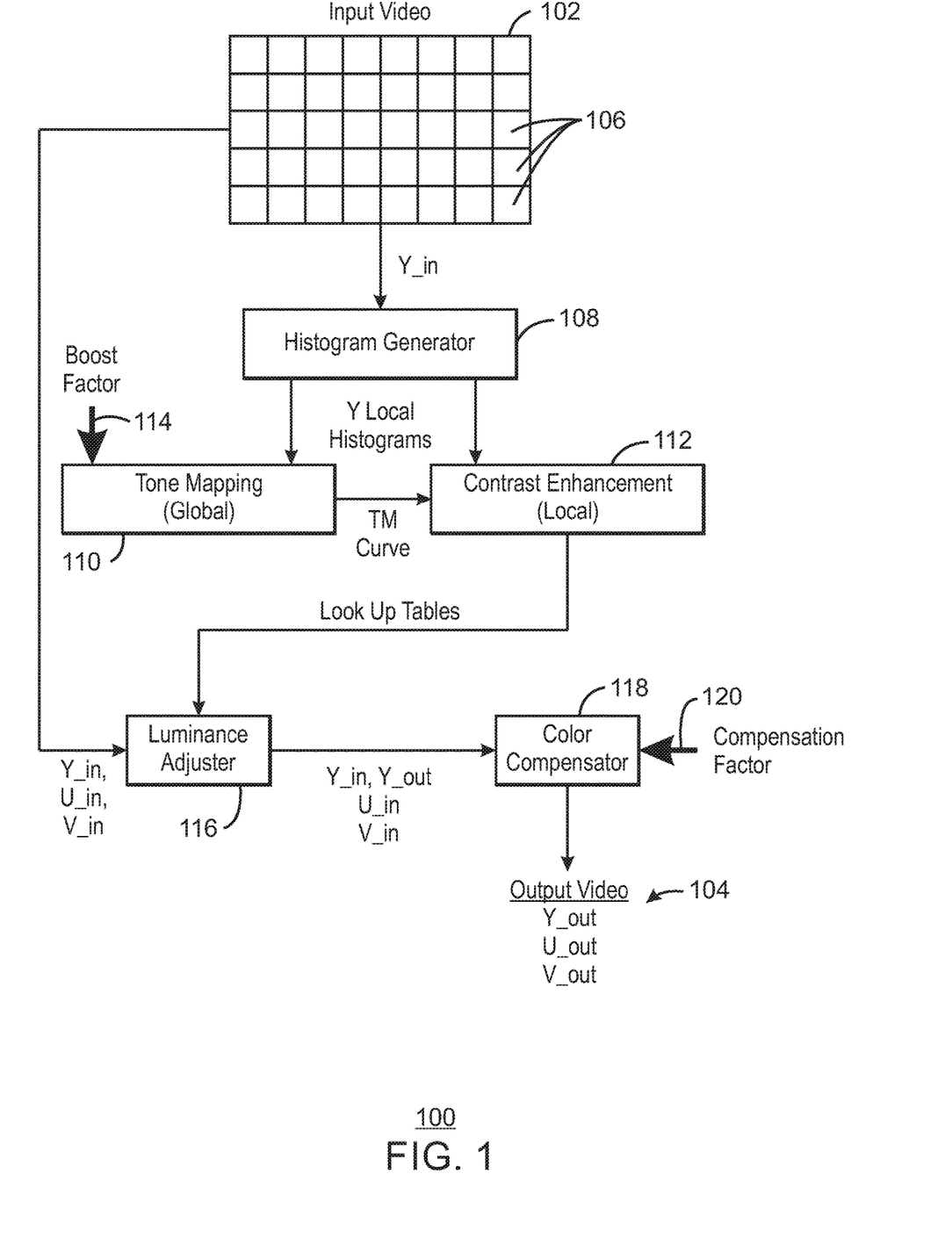
FIG. 1 is a block diagram of a system for improving the visual perception of dark scenes.

FIG. 1 is a block diagram of a system for improving the visual perception of dark scenes. The system may be implemented in a variety of different types of computing architectures, including multiple integrated circuit (IC) chips or packages, a system-on-a-chip (SoC) architecture, a general purpose processor executing stored instructions, and others. Implementation of the techniques or arrangements described herein are not restricted to particular architectures or computing systems and may be implemented by any suitable architecture or computing system. Further, while the following description may set forth numerous specific details such as logic implementations, types and interrelationships of system components, logic partitioning and integration choices, etc., the claimed subject matter may be practiced without such specific details.

The system 100 can receive a video stream and process the video to increase the overall brightness perception of the dark scene content while enhancing the local contrast and preserving the color vividness. The input video frame may be received, for example, through a terrestrial television transmission, from a storage device, streaming over the internet, and others. In some embodiments, the video data may undergo additional processing before being processed by the system shown in FIG. 1. For example, the video stream may be decoded from a compressed format. The video stream received by the system 100 may be processed one frame at a time to generate output video to be sent to a display device (not shown). In some embodiments, the output video may be re-encoded and stored for later use.

The system 100 receives an input video frame 102 and processes the video frame to generate the output video frame 104. In this example, both the input frame and output frame are use the YUV color encoding scheme, which defines the color space in terms of a luminance component (Y) and two chrominance components, referred to as the U component and V component. However, other color encoding schemes are also possible, such as RGB, YcbCr, and others.

The input video frame 102 may be divided into a plurality of sub-regions 106, which may be overlapping or non-overlapping rectangular sub-regions as shown in FIG. 1. This enables local contrast enhancement that is better suited to the content of each sub-region. For example, more highly textured sub-regions can receive greater contrast enhancement to bring out details, while more homogenous sub-regions can receive less contrast enhancement to avoid enhancing noise in the video data. The input video frame 102 may be divided into any suitable number of sub-regions, which may be predetermined according to the programming of system 100. For example, the number of sub-regions may be 12, 24, 48, 64, and others.

The luminance component of the input video data is processed by the histogram generator 108, which generates a separate local histogram for each of the sub-regions. Each local histogram is a data structure that represents the brightness values present in the corresponding sub-region. The histogram may be stored as a vector, wherein each position in the vector represents one of the possible luminance values, and the value stored to each vector position represents the number of pixels that have that particular luminance value. The histogram can be thought of a bar chart wherein each of the possible luminance (Y) values is presented along the X-axis, and the frequency of occurrence for each of the luminance values (i.e., the number of pixels that have that luminance value) is represented along the Y-axis.

The local histograms are then processed in parallel by both the tone mapping logic 110 and the contrast enhancement logic 112. The tone mapping logic 110 sums all of the local histograms to generate a global histogram. The global histogram is then used to generate a global tone mapping curve that maps each possible input pixel value to a new output pixel value. The global tone mapping curve describes the brightness adjustment for the input frame by describing the level of adjustment for each of the possible luminance values. The tone mapping curve is a global tone mapping function, meaning that it applies to the entire video frame as compared to a local tone mapping, in which different tone mapping curves would be applied to the different sub-regions within the video frame.

The derivation of the global tone mapping curve involves many factors that depend on characteristics of the content of the video frame and, in some cases, the desired visual appearance as designed by the content creator. To enhance the brightness and contrast for dark video, the global tone mapping curve can map the histogram of the input picture into a new histogram of the output picture with increased brightness. For example, the global tone mapping curve could move the histogram of a target pixel range of the input picture by a specified percentage to generate a new histogram of output picture.

The global tone mapping curve may also be adjusted depending one a boost factor input 114, which may be specified by the user of the device or by a software application, for example. The boost factor is a configurable parameter that provides flexibility to have different levels of luminance level adjustment based on the usages or user preference. For example, the boost factor can be specified as an additional percentage increase in the histogram of the target pixel range of the input picture. The resulting global tone mapping curve is sent to the contrast enhancement logic 112.

The contrast enhancement logic 112 analyzes the local histogram information to derive a list of look up tables (LUTs) used for transferring the luminance value of each sub-region to achieve content-adaptive local contrast adjustment. The list of LUTs includes a separate LUT for each sub-region of the input video frame 102. Each LUT may be generated by generating a contrast compensation function (e.g., local tone mapping curve) for each sub-region based on the local histogram for the sub-region. The contrast compensation function may then be used to generate an initial LUT for the corresponding sub-region. The final LUT for each sub-region can then be generated based on a weighted average of the LUTs within neighboring sub-regions. For example, for each 3-by-3 block of sub-regions, the final LUT of the center sub-region can be a weighted average of the center LUT and all of the other LUTS in that 3-by-3 block. In this way, edge artifacts between sub-regions can be eliminated or reduced by the smoothing effect of weighting each LUT according to the LUTs of the neighboring sub-regions.

In addition to enhancing contrast, the contrast enhancement logic 112 also derives the LUTs based in part on the global tone mapping curve received from the tone mapping logic 110. Therefore, the resulting regional LUTs applied to the luminance channel would have the effect of both luminance level boost and local dynamic range stretch. In some embodiments, the tone mapping curve generated by the tone mapping logic 110 is factored into the LUT generation as another weighted value factored in during the generation of the final LUT from the initial LUTs. In some embodiments, the tone mapping curve generated by the tone mapping logic 110 is factored into the LUT generation by serving as a threshold for gating the range of luminance adjustment.

Each of the resulting final LUTs, also referred to herein as "tone mapping LUTs", correlate input luminance values with corresponding output luminance values. The effect of applying the LUT to the image data will be to increase the overall luminance of the video frame and also increase the luminance contrast between neighboring pixels (or neighboring groups of pixels) based in part on the luminance content of each sub-region.

The LUTs are sent to the luminance adjuster 116, which also receives the data for the input video data (Y_in, U_in, V_in). For each pixel of the video frame, the original luminance value, Y_in is input to the corresponding LUT to obtain an output luminance value, Y_out. In some embodiments, each LUT will have a number of entry points that is less than the number of possible luminance values. Thus, in some cases, the output luminance values may be obtained by linear interpolation between the entry points.

The input video frame data, Y_in, U_in, V_in, and the output luminance values Y_out are sent to the color compensator 118, which adjusts the input chrominance pixel values, U_in and V_in, based in part on the change in the luminance values. The amount of color change for each pixel depends on the input luminance value, Y_in, for that pixel and the output luminance values, Y_out, for the pixel. In some embodiments, the chrominance values also depend in part on a compensation factor 120, which may be specified by the user of the device or by a software application, for example. The compensation factor is a configurable parameter that provides flexibility to have different levels of color saturation adjustment based on the usages or user preference.

The color compensation applied on a pixel located at (x,y) coordinate within an input frame may be computed as described by Equations 1 and 2 below.

$$\begin{cases} U_{out}(x, y) = [U_{in}(x, y) - U_{offset}] * [sf(x, y)]^{\frac{1}{\gamma}} + U_{offset} \\ V_{out}(x, y) = [V_{in}(x, y) - V_{offset}] * [sf(x, y)]^{\frac{1}{\gamma}} + V_{offset} \end{cases}, \text{where} \quad \text{Eq. 1}$$

$$sf(x, y) = \frac{Y_{out}(x, y) - Y_{offset}}{Y_{in}(x, y) - Y_{offset}}. \quad \text{Eq. 2}$$

In the above equations, $\gamma$ represents the compensation factor, which may be limited between 1 and 3, and sf (x,y) represents the chrominance scaling factor for the x,y pixel. Additionally, $U_{in}$, $V_{in}$, and $Y_{in}$ represent the original input pixel data, $U_{out}$, $V_{out}$, and $Y_{out}$ represents the output pixel data, and $U_{offset}$, $V_{offset}$, and $Y_{offset}$ represent offset values used to transform each chrominance value before multiplying the chrominance value by the scaling factor. As seen in equations 1 and 2, the change in each chrominance value will be proportional to the amount of change in the luminance value for that pixel (i.e., the ratio of the output luminance value and the input luminance value) as modified by the compensation factor. In some embodiments, the term sf(x,y) in Equation 2 is obtained via hardware division while the term $$[sf(x, y)]^{\frac{1}{\gamma}}$$

in Equation 1 is realized via a Piecewise Linear Function. Other formulas for adjusting the chrominance are also possible.

The output video 104 of the color compensator includes the output pixel values, Y_out, U_out, and V_out for each pixel of the video frame. The output may be sent to a rendering device such as a display screen, stored to an electronic storage device, streamed over a network connection to a different electronic device, etc.

Figure 2:
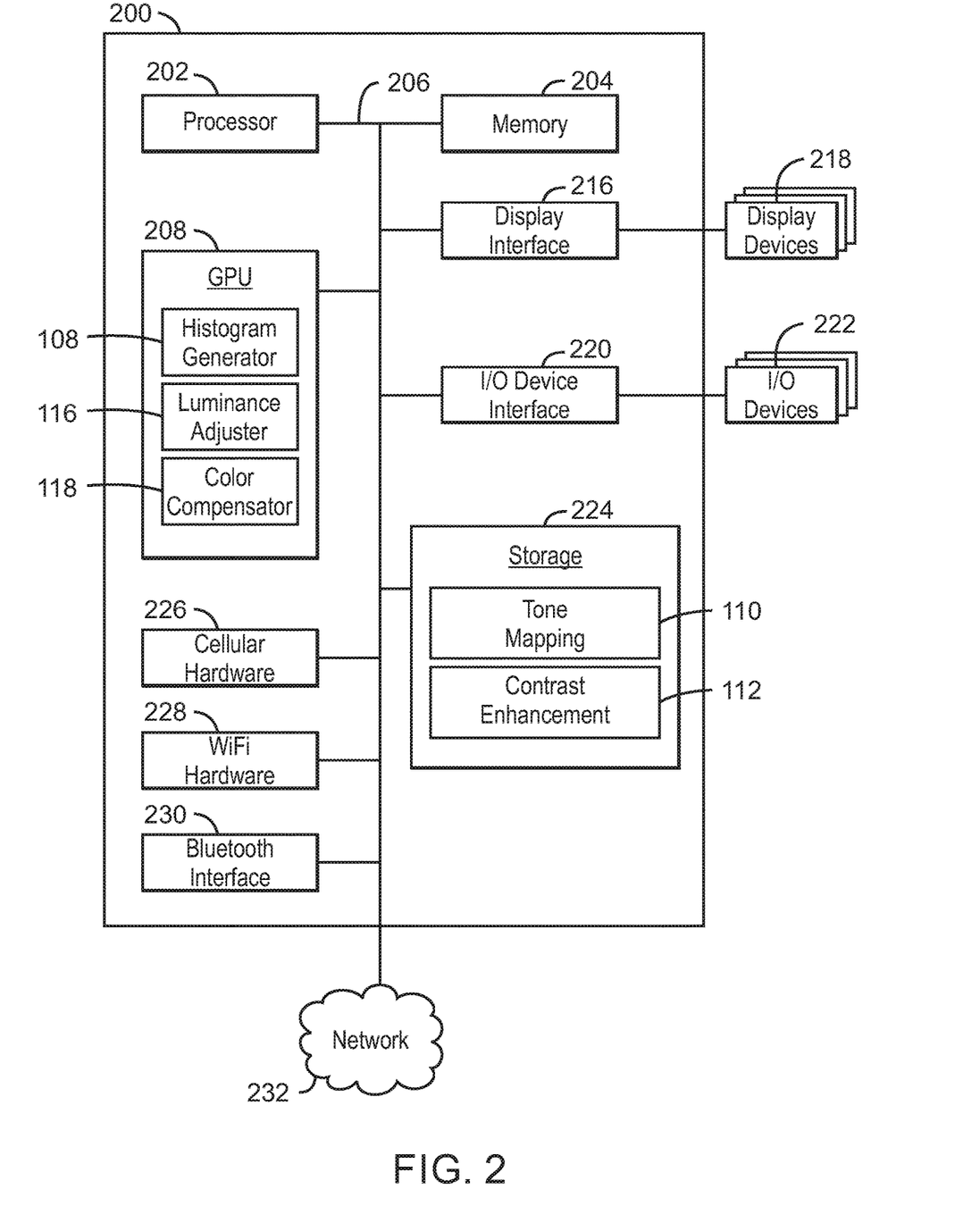
FIG. 2 is a block diagram of an electronic device 200 configured to improve visual perception of dark scenes.

FIG. 2 is a block diagram of an electronic device 200 configured to improve visual perception of dark scenes. The electronic device 200 may be, for example, a laptop computer, tablet computer, smart phone, television, set top box, or video streaming device, among others.

The electronic device 200 may include a central processing unit (CPU) 202 that is configured to execute stored instructions, as well as a memory device 204 that stores instructions that are executable by the CPU 202. The CPU may be coupled to the memory device 204 by a bus 206. Additionally, the CPU 202 can be a single core processor, a multi-core processor, a computing cluster, or any number of other configurations. Furthermore, the electronic device 200 may include more than one CPU 202. The memory device 204 can include random access memory (RAM), read only memory (ROM), flash memory, or any other suitable memory systems. For example, the memory device 204 may include dynamic random access memory (DRAM).

The electronic device 200 also includes a graphics processing unit (GPU) 208. As shown, the CPU 202 can be coupled through the bus 206 to the GPU 208. The GPU 208 can be configured to perform any number of graphics operations within the electronic device 200. For example, the GPU 208 can be configured to render or manipulate graphics images, graphics frames, videos, or the like, to be displayed to a user of the electronic device 200. In some embodiments, the GPU 208 includes a number of graphics engines, wherein each graphics engine is configured to perform specific graphics tasks, or to execute specific types of workloads.

The CPU 202 can be linked through the bus 206 to a display interface 216 configured to connect the electronic device 200 to one or more display devices 218. The display devices 218 can include a display screen that is a built-in component of the electronic device 200. The display devices 218 can also include a computer monitor, television, or projector, among others, that is externally connected to the electronic device 200.

The CPU 202 can also be connected through the bus 206 to an input/output (I/O) device interface 220 configured to connect the electronic device 200 to one or more I/O devices 222. The I/O devices 222 can include, for example, a keyboard and a pointing device, wherein the pointing device can include a touchpad or a touchscreen, among others. The I/O devices 222 can be built-in components of the electronic device 200, or can be devices that are externally connected to the electronic device 200.

The storage device 224 is a physical memory such as a hard drive, an optical drive, a flash drive, an array of drives, or any combinations thereof. The storage device 224 can store user data, such as audio files, video files, audio/video files, and picture files, among others. The storage device 224 can also store programming code such as device drivers, software applications, operating systems, and the like. The programming code stored to the storage device 224 may be executed by the CPU 202, GPU 208, or any other processors that may be included in the electronic device 200.

The CPU 202 may be linked through the bus 206 to cellular hardware 226.

The cellular hardware 226 may be any cellular technology, for example, the 4G and 5G standard (International Mobile Telecommunications-Advanced (IMT-Advanced) Standard promulgated by the International Telecommunications Union-Radio communication Sector (ITU-R)). In this manner, the electronic device 200 may access any network 232 without being tethered or paired to another device, where the network 232 is a cellular network.

The CPU 202 may also be linked through the bus 206 to WiFi hardware 228. The WiFi hardware is hardware according to WiFi standards (standards promulgated as Institute of Electrical and Electronics Engineers' (IEEE) 802.11 standards). The WiFi hardware 228 enables the electronic device 200 to connect to the Internet using the Transmission Control Protocol and the Internet Protocol (TCP/IP), where the network 232 is the Internet. Accordingly, the electronic device 200 can enable end-to-end connectivity with the Internet by addressing, routing, transmitting, and receiving data according to the TCP/IP protocol without the use of another device. Additionally, a Bluetooth Interface 230 may be coupled to the CPU 202 through the bus 206. The Bluetooth Interface 230 is an interface according to Bluetooth networks (based on the Bluetooth standard promulgated by the Bluetooth Special Interest Group). The Bluetooth Interface 230 enables the electronic device 200 to be paired with other Bluetooth enabled devices through a personal area network (PAN). Accordingly, the network 232 may be a PAN. Examples of Bluetooth enabled devices include a laptop computer, desktop computer, ultrabook, tablet computer, mobile device, or server, among others.

The electronic device 200 is configured to implement the techniques described above in relation to FIG. 1. The processing units described in FIG. 1 may be implemented in hardware or a combination of hardware and software. In the example shown in FIG. 2, the histogram generator 108, luminance adjuster 116, and color compensator 118 are implemented as logic units incorporated into the GPU 208, while the tone mapping logic 110 and contrast enhancement logic 112 are implemented as computer-readable software instructions saved in the storage 224. However, other implementations are also possible.

The block diagram of FIG. 2 is not intended to indicate that the electronic device 200 is to include all of the components shown in FIG. 2. Rather, the electronic device 200 can include fewer or additional components not illustrated in FIG. 2 (e.g., sensors, power management integrated circuits, additional network interfaces, etc.). The electronic device 200 may include any number of additional components not shown in FIG. 2, depending on the details of the specific implementation. Furthermore, any of the functionalities of the CPU 202 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 3:
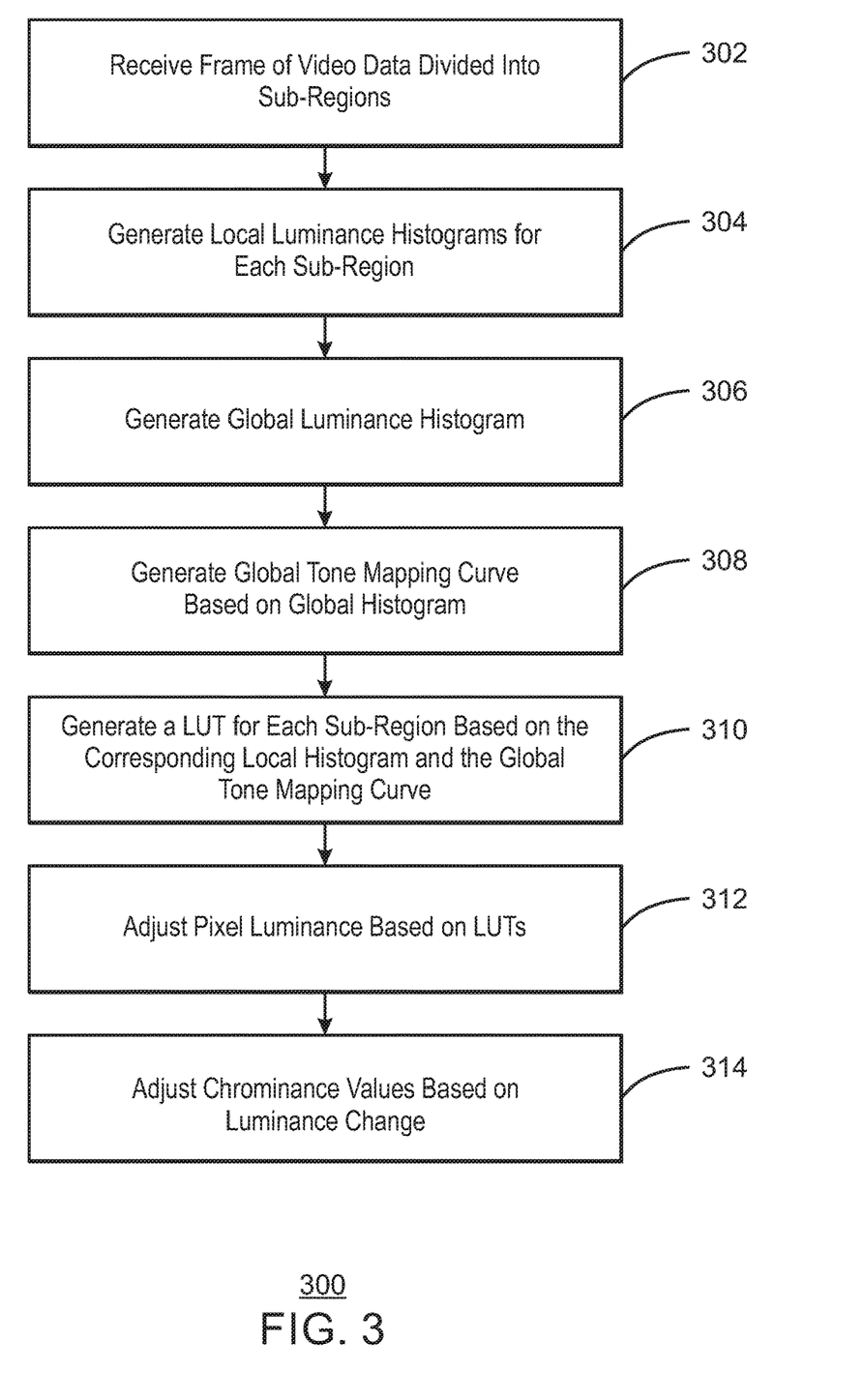
FIG. 3 is a process flow diagram summarizing a method of processing video to improve the visual perception of dark scenes.

FIG. 3 is a process flow diagram summarizing a method of processing video to improve the visual perception of dark scenes. The process may be performed by the system 100 of FIG. 1 operating, for example, on the electronic device 200 of FIG. 2. The method may begin at block 302.

At block 302, a frame of decoded video data is received. As described above, the frame of video data is divided into sub-regions and is color coded to include a luminance component, Y, and two chrominance components, U and V.

At block 304, local luminance histograms are generated for each of the sub-regions in the video frame. The local histograms may be generated by the histogram generator 108 as described in relation to FIGS. 1 and 2.

At block 306, the local luminance histograms are summed to provide a global luminance histogram. The global luminance histogram may be generated by the tone mapping logic 110 as described in relation to FIGS. 1 and 2.

At block 308, a global tone mapping curve is generated based, at least on part, on the global histogram. The tone mapping curve may also be dependent on a boost factor specified to provide a customizable level of brightness adjustment. The global tone mapping curve may be generated by the tone mapping logic 110 as described in relation to FIGS. 1 and 2.

At block 310, a LUT is generated for each of the sub-regions based on the corresponding local histogram for that sub-region and the global tone mapping curve. The LUTs may be generated by the contrast enhancement logic 112 as described in relation to FIGS. 1 and 2.

At block 312, the luminance of each pixel of the input image frame is adjusted using the LUTs. For each pixel, the luminance value of the pixel is input to the LUT generated for that pixel's sub-region. The LUT returns a new output luminance value, which replaces the input luminance. This luminance adjustment may be performed by the luminance adjuster as described in relation to FIGS. 1 and 2.

At block 314, the chrominance components of the video frame data is adjusted based on the changes in the luminance values. The color adjustment is performed for each pixel individually based, at least in part, on the change in the luminance value for the corresponding pixel. The color adjustment may also be dependent on a compensation factor specified to provide a customizable level of color adjustment. This color adjustment may be performed by the color compensator 118 as described in relation to FIGS. 1 and 2.

The output video frame data resulting from the process above may be sent to an output device to be rendered, stored, re-coded, etc. The method 300 may be repeated for each frame of video data as it is received. The method 300 should not be interpreted as meaning that the blocks are necessarily performed in the order shown. Furthermore, fewer or greater actions can be included in the method 300 depending on the design considerations of a particular implementation.

Figure 4:
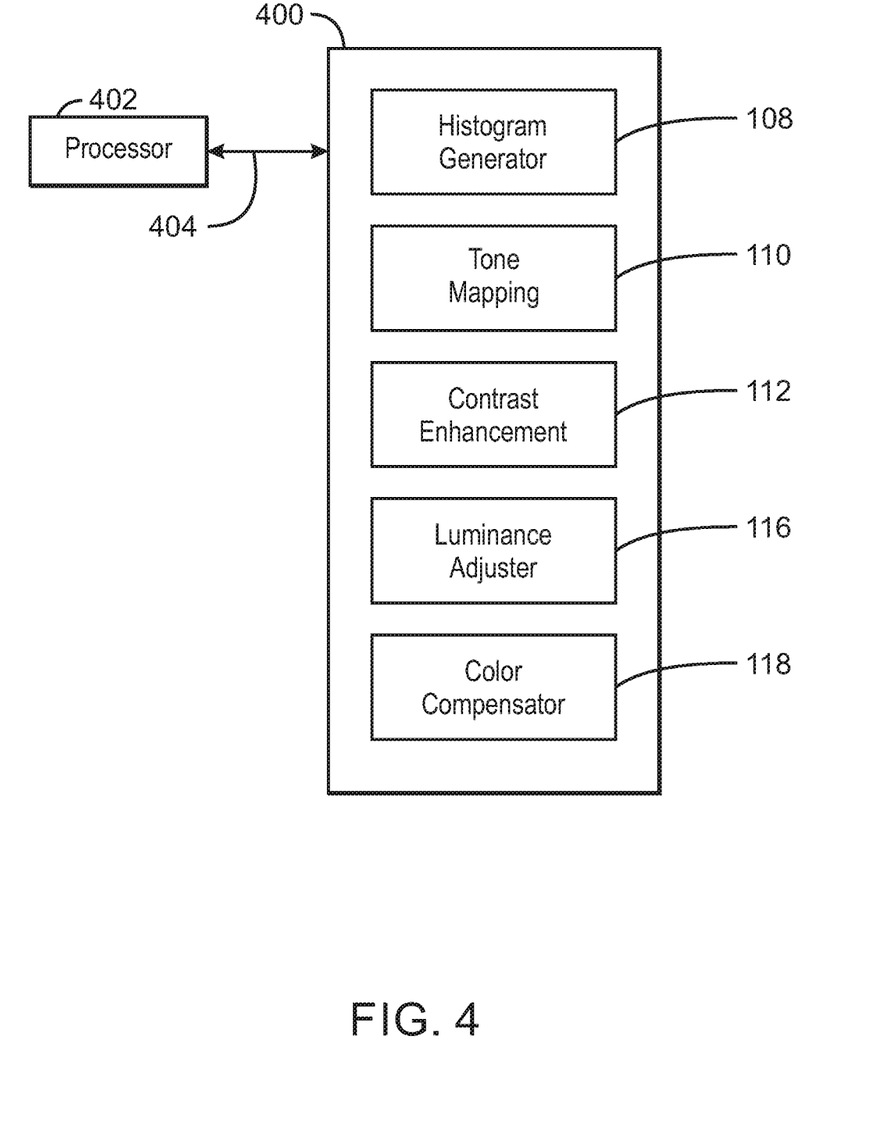
FIG. 4 is a block diagram showing a medium 400 that contains logic for processing video to improve the visual perception of dark scenes.

FIG. 4 is a block diagram showing a medium 400 that contains logic for processing video to improve the visual perception of dark scenes. The medium 400 may be a computer-readable medium, including a non-transitory medium that stores code that can be accessed by a processor 402 over a computer bus 404. For example, the computer-readable medium 400 can be volatile or non-volatile data storage device. The medium 400 can also be a logic unit, such as an Application Specific Integrated Circuit (ASIC), a Field Programmable Gate Array (FPGA), or an arrangement of logic gates implemented in one or more integrated circuits, for example.

The medium 400 may include modules configured to perform the techniques described herein. For example, the medium can include the histogram generator 108, tone mapping logic 110, contrast enhancement logic 112, luminance adjuster 116, and color compensator 118. The block diagram of FIG. 4 is not intended to indicate that the medium 400 is to include all of the components shown in FIG. 4. Further, the medium 400 may include any number of additional components not shown in FIG. 4, depending on the details of the specific implementation.

EXAMPLES

Example 1 is an electronic device configured to process video to improve a visual perception of dark scenes. The electronic device includes one or more processors to receive a frame of video, wherein the frame comprises a plurality of pixels segmented into a plurality of sub-regions, each pixel comprising an input luminance value. The processors generate a local luminance histogram for each sub-region of the plurality of sub-regions, generate a global luminance histogram for the entire frame of video, and generate a global tone mapping curve based on the global luminance histogram. The processors generate a tone mapping LUT for each sub-region based on the global tone mapping curve and the corresponding local luminance histogram for the sub-region. The processors also modify the frame of video by determining an output luminance value for each pixel by looking up the input luminance value of the pixel in the tone mapping LUT generated for the pixel's sub-region, and send the modified frame of video to an output device.

Example 2 includes the electronic device of example 1. In this example, the one or more processors are to further modify the frame of video by adjusting chrominance values of each pixel based on a difference between the input luminance value of the pixel and the output luminance value of the pixel. Optionally, to adjust the chrominance values of each pixel is further based on a color compensation factor selected by a user of the electronic device. A change in each chrominance value may be proportional to a ratio of the output luminance value of the pixel and the input luminance value of the pixel as modified by the compensation factor. Optionally, the output chrominance values may be computed according to the Equations 1 and 2 shown above.

Example 3 includes the electronic device of any one of examples 1 to 2, including or excluding optional features. In this example, to generate the tone mapping LUT for each sub-region, the one or more processors are to generate an initial LUT for each sub-region based on the local luminance histogram for the sub-region, and for each sub-region, compute a weighted average of the sub-region's initial LUT and the initial LUTs of neighboring sub-regions.

Example 4 includes the electronic device of any one of examples 1 to 3, including or excluding optional features. In this example, to generate the tone mapping LUT for each sub-region, the one or more processors are to generate an initial LUT for each sub-region based on the local luminance histogram for the sub-region, and for each sub-region, compute a weighted average of the global tone mapping curve, the sub-region's initial LUT, and the initial LUTs of neighboring sub-regions.

Example 5 includes the electronic device of any one of examples 1 to 4, including or excluding optional features. In this example, the global tone mapping curve is based further on a boost factor selected by a user of the electronic device.

Example 6 includes the electronic device of any one of examples 1 to 5, including or excluding optional features. In this example, the one or more processors determine the output luminance value for each pixel by linear interpolation between entry points of the LUT generated for the pixel's sub-region.

Example 7 includes the electronic device of any one of examples 1 to 6, including or excluding optional features. In this example, to send the modified frame of video to an output device comprises sending the modified frame of video to a display device to be rendered.

Example 8 is a method of processing video. The method includes receiving a frame of video, wherein the frame comprises a plurality of pixels segmented into a plurality of sub-regions, each pixel comprising an input luminance value. The method also includes generating a local luminance histogram for each sub-region of the plurality of sub-regions, generating a global luminance histogram for the entire frame of video and generating a global tone mapping curve based on the global luminance histogram, and generating a tone mapping LUT for each sub-region based on the global tone mapping curve and the corresponding local luminance histogram for the sub-region. The method also includes modifying the frame of video by determining an output luminance value for each pixel by looking up the input luminance value of the pixel in the tone mapping LUT generated for the pixel's sub-region, and sending the modified frame of video to an output device.

Example 9 includes the method of example 8. In this example, the method includes further modifying the frame of video by adjusting chrominance values of each pixel based on a difference between the input luminance value of the pixel and the output luminance value of the pixel. Optionally, adjusting the chrominance values of each pixel is further based on a color compensation factor selected by a user of the electronic device. A change in each chrominance value may be proportional to a ratio of the output luminance value of the pixel and the input luminance value of the pixel as modified by the compensation factor. Optionally, the output chrominance values may be computed according to the Equations 1 and 2 shown above.

Example 10 includes the method of any one of examples 8 to 9, including or excluding optional features. In this example, generating the tone mapping LUT for each sub-region comprises generating an initial LUT for each sub-region based on the local luminance histogram for the sub-region, and for each sub-region, computing a weighted average of the sub-region's initial LUT and the initial LUTs of neighboring sub-regions.

Example 11 includes the method of any one of examples 8 to 10, including or excluding optional features. In this example, generating the tone mapping LUT for each sub-region comprises generating an initial LUT for each sub-region based on the local luminance histogram for the sub-region, and for each sub-region, computing a weighted average of the global tone mapping curve, the sub-region's initial LUT, and the initial LUTs of neighboring sub-regions.

Example 12 includes the method of any one of examples 8 to 11, including or excluding optional features. In this example, computing the global tone mapping curve is based further on a boost factor selected by a user of the electronic device.

Example 13 includes the method of any one of examples 8 to 12, including or excluding optional features. In this example, determining the output luminance value for each pixel comprises performing linear interpolation between entry points of the LUT generated for the pixel's sub-region.

Example 14 includes the method of any one of examples 8 to 13, including or excluding optional features. In this example, sending the modified frame of video to an output device comprises sending the modified frame of video to a display device to be rendered.

Example 15 is at least one non-transitory machine-readable medium having instructions stored therein. The instructions cause a computing device to receive a frame of video, wherein the frame comprises a plurality of pixels segmented into a plurality of sub-regions, each pixel comprising an input luminance value. The instructions cause the computing device to generate a local luminance histogram for each sub-region of the plurality of sub-regions, generate a global luminance histogram for the entire frame of video, and generate a global tone mapping curve based on the global luminance histogram. The instructions also cause the computing device to generate a tone mapping LUT for each sub-region based on the global tone mapping curve and the corresponding local luminance histogram for the sub-region. The instructions also cause the computing device to modify the frame of video by determining an output luminance value for each pixel by looking up the input luminance value of the pixel in the tone mapping LUT generated for the pixel's sub-region, and send the modified frame of video to an output device.

Example 16 includes the computer-readable medium of example 15. In this example, the instructions cause the computing device to further modify the frame of video by adjusting chrominance values of each pixel based on a difference between the input luminance value of the pixel and the output luminance value of the pixel. Optionally, to adjust the chrominance values of each pixel is further based on a color compensation factor selected by a user of the electronic device. A change in each chrominance value may be proportional to a ratio of the output luminance value of the pixel and the input luminance value of the pixel as modified by the compensation factor. Optionally, the output chrominance values may be computed according to the Equations 1 and 2 shown above.

Example 17 includes the computer-readable medium of any one of examples 15 to 16, including or excluding optional features. In this example, to generate the tone mapping LUT for each sub-region, the instructions cause the computing device to generate an initial LUT for each sub-region based on the local luminance histogram for the sub-region, and for each sub-region, compute a weighted average of the sub-region's initial LUT and the initial LUTs of neighboring sub-regions.

Example 18 includes the computer-readable medium of any one of examples 15 to 17, including or excluding optional features. In this example, to generate the tone mapping LUT for each sub-region, the instructions cause the computing device to generate an initial LUT for each sub-region based on the local luminance histogram for the sub-region, and for each sub-region, compute a weighted average of the global tone mapping curve, the sub-region's initial LUT, and the initial LUTs of neighboring sub-regions.

Example 19 includes the computer-readable medium of any one of examples 15 to 18, including or excluding optional features. In this example, the global tone mapping curve is based further on a boost factor selected by a user of the computing device.

Example 20 includes the computer-readable medium of any one of examples 15 to 19, including or excluding optional features. In this example, the instructions cause the computing device to determine the output luminance value for each pixel by linear interpolation between entry points of the LUT generated for the pixel's sub-region.

Example 21 includes the computer-readable medium of any one of examples 15 to 20, including or excluding optional features. In this example, to send the modified frame of video to an output device comprises to send the modified frame of video to a display device to be rendered.

Example 22 is a system to process video to improve a visual perception of dark scenes. The system includes a histogram generator to generate a local luminance histogram for each sub-region of a frame of video comprising a plurality of sub-regions. The system also includes tone mapping logic to generate a global luminance histogram for the entire frame of video and generate a global tone mapping curve based on the global luminance histogram. The system also includes contrast enhancement logic to generate a tone mapping LUT for each sub-region based on the global tone mapping curve and the corresponding local luminance histogram for the sub-region. The system also includes a luminance adjuster to modify the frame of video by determining an output luminance value for each pixel of the frame of video by looking up the input luminance value of the pixel in the tone mapping LUT generated for the pixel's sub-region.

Example 23 includes the system of example 22. In this example, the system includes a color compensator to further modify the frame of video by adjusting chrominance values of each pixel based on a difference between the input luminance value of the pixel and the output luminance value of the pixel. Optionally, the color compensator is to further adjust the chrominance values of each pixel based on a color compensation factor selected by a user of the system. A change in each chrominance value may be proportional to a ratio of the output luminance value of the pixel and the input luminance value of the pixel as modified by the compensation factor. Optionally, the output chrominance values may be computed according to the Equations 1 and 2 shown above.

Example 24 includes the system of any one of examples 22 to 23, including or excluding optional features. In this example, to generate the tone mapping LUT for each sub-region, the contrast enhancement logic is to generate an initial LUT for each sub-region based on the local luminance histogram for the sub-region, and for each sub-region, compute a weighted average of the sub-region's initial LUT and the initial LUTs of neighboring sub-regions.

Example 25 includes the system of any one of examples 22 to 24, including or excluding optional features. In this example, to generate the tone mapping LUT for each sub-region, the contrast enhancement logic is to generate an initial LUT for each sub-region based on the local luminance histogram for the sub-region, and for each sub-region, compute a weighted average of the global tone mapping curve, the sub-region's initial LUT, and the initial LUTs of neighboring sub-regions.

Example 26 includes the system of any one of examples 22 to 25, including or excluding optional features. In this example, the tone mapping logic is to generate the global tone mapping curve based further on a boost factor selected by a user of the system.

Example 27 includes the system of any one of examples 22 to 26, including or excluding optional features. In this example, the luminance adjuster is to determine the output luminance value for each pixel by linear interpolation between entry points of the LUT generated for the pixel's sub-region.

Example 28 includes the system of any one of examples 22 to 27, including or excluding optional features. In this example, the color compensator is to send the modified frame of video to an output device to be rendered.

Example 29 is a system to process video to improve a visual perception of dark scenes. The system includes means for generating a local luminance histogram for each sub-region of a frame of video comprising a plurality of sub-regions. The system also includes means for generating a global luminance histogram for the entire frame of video and generating a global tone mapping curve based on the global luminance histogram. The system also includes means for generating a tone mapping LUT for each sub-region based on the global tone mapping curve and the corresponding local luminance histogram for the sub-region. The system also includes means for adjusting an output luminance value for each pixel of the frame of video by looking up the input luminance value of the pixel in the tone mapping LUT generated for the pixel's sub-region.

Example 30 includes the system of example 29. In this example, the system includes means for adjusting chrominance values of each pixel based on a difference between the input luminance value of the pixel and the output luminance value of the pixel to generate a modified frame of video. Optionally, the means for adjusting chrominance values of each pixel is to further adjust the chrominance values of each pixel based on a color compensation factor selected by a user of the system. A change in each chrominance value may be proportional to a ratio of the output luminance value of the pixel and the input luminance value of the pixel as modified by the compensation factor. Optionally, the output chrominance values may be computed according to the Equations 1 and 2 shown above.

Example 31 includes the system of any one of examples 29 to 30, including or excluding optional features. In this example, the means for generating the tone mapping LUT is to generate an initial LUT for each sub-region based on the local luminance histogram for the sub-region, and for each sub-region, compute a weighted average of the sub-region's initial LUT and the initial LUTs of neighboring sub-regions.

Example 32 includes the system of any one of examples 29 to 31, including or excluding optional features. In this example, the means for generating the tone mapping LUT is to generate an initial LUT for each sub-region based on the local luminance histogram for the sub-region, and for each sub-region, compute a weighted average of the global tone mapping curve, the sub-region's initial LUT, and the initial LUTs of neighboring sub-regions.

Example 33 includes the system of any one of examples 29 to 32, including or excluding optional features. In this example, the means for generating a global luminance histogram and generating a global tone mapping curve is to generate the global tone mapping curve based further on a boost factor selected by a user of the system.

Example 34 includes the system of any one of examples 29 to 33, including or excluding optional features. In this example, the means for adjusting an output luminance value is to determine the output luminance value for each pixel by linear interpolation between entry points of the LUT generated for the pixel's sub-region.

Example 35 includes the system of any one of examples 29 to 34, including or excluding optional features. In this example, the means for adjusting chrominance values of each pixel is to send the modified frame of video to an output device to be rendered.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An electronic device configured to process video to improve a visual perception of dark scenes, comprising:
one or more processors to:
  receive a frame of video, wherein the frame comprises a plurality of pixels segmented into a plurality of sub-regions, each pixel comprising an input luminance value;
  generate a local luminance histogram for each sub-region of the plurality of sub-regions;
  generate a global luminance histogram for the entire frame of video and generate a global tone mapping curve based on the global luminance histogram;
  generate a tone mapping LUT for each sub-region based on the global tone mapping curve and the corresponding local luminance histogram for the sub-region;
  modify the frame of video by determining an output luminance value for each pixel by looking up the input luminance value of the pixel in the tone mapping LUT generated for the pixel's sub-region; and
  send the modified frame of video to an output device.

2. The electronic device of claim 1, wherein the one or more processors are to further modify the frame of video by adjusting chrominance values of each pixel based on a difference between the input luminance value of the pixel and the output luminance value of the pixel.

3. The electronic device of claim 2, wherein to adjust the chrominance values of each pixel is further based on a color compensation factor selected by a user of the electronic device.

4. The electronic device of claim 3, wherein a change in each chrominance value is proportional to a ratio of the output luminance value of the pixel and the input luminance value of the pixel as modified by the compensation factor.

5. The electronic device of claim 3, wherein to adjust the chrominance values of each pixel, output chrominance values are computed according to the following formulas:

$$\begin{cases} U_{out}(x, y) = [U_{in}(x, y) - U_{offset}] * [sf(x, y)]^{\frac{1}{\gamma}} + U_{offset} \\ V_{out}(x, y) = [V_{in}(x, y) - V_{offset}] * [sf(x, y)]^{\frac{1}{\gamma}} + V_{offset} \end{cases},$$

$$\text{where } sf(x, y) = \frac{Y_{out}(x, y) - Y_{offset}}{Y_{in}(x, y) - Y_{offset}}$$

wherein $\gamma$ represents the compensation factor, $U_{in}$, $V_{in}$, and $Y_{in}$ represent the original input pixel data, $U_{out}$, $V_{out}$, and $Y_{out}$ represents the output pixel data, and $U_{offset}$, $V_{offset}$, and $Y_{offset}$ represent offset values.

6. The electronic device of claim 1, wherein to generate the tone mapping LUT for each sub-region, the one or more processors are to:
  generate an initial LUT for each sub-region based on the local luminance histogram for the sub-region; and
  for each sub-region, compute a weighted average of the sub-region's initial LUT and the initial LUTs of neighboring sub-regions.

7. The electronic device of claim 1, wherein to generate the tone mapping LUT for each sub-region, the one or more processors are to:
  generate an initial LUT for each sub-region based on the local luminance histogram for the sub-region; and
  for each sub-region, compute a weighted average of the global tone mapping curve, the sub-region's initial LUT, and the initial LUTs of neighboring sub-regions.

8. The electronic device of claim 1, wherein the global tone mapping curve is based further on a boost factor selected by a user of the electronic device.

9. The electronic device of claim 1, wherein the one or more processors determine the output luminance value for each pixel by linear interpolation between entry points of the LUT generated for the pixel's sub-region.

10. The electronic device of claim 1, wherein to send the modified frame of video to an output device comprises sending the modified frame of video to a display device to be rendered.

11. A method of processing video in an electronic device, comprising:
  receiving a frame of video, wherein the frame comprises a plurality of pixels segmented into a plurality of sub-regions, each pixel comprising an input luminance value;
  generating a local luminance histogram for each sub-region of the plurality of sub-regions;
  generating a global luminance histogram for the entire frame of video and generating a global tone mapping curve based on the global luminance histogram;
  generating a tone mapping LUT for each sub-region based on the global tone mapping curve and the corresponding local luminance histogram for the sub-region;

modifying the frame of video by determining an output luminance value for each pixel by looking up the input luminance value of the pixel in the tone mapping LUT generated for the pixel's sub-region; and sending the modified frame of video to an output device.

12. The method of claim 11, comprising further modifying the frame of video by adjusting chrominance values of each pixel based on a difference between the input luminance value of the pixel and the output luminance value of the pixel.

13. The method of claim 12, wherein adjusting the chrominance values of each pixel is further based on a color compensation factor selected by a user of the electronic device.

14. The method of claim 13, wherein a change in each chrominance value is proportional to a ratio of the output luminance value of the pixel and the input luminance value of the pixel as modified by the compensation factor.

15. The method of claim 13, wherein adjusting the chrominance values of each pixel comprises computing output chrominance values according to the following formulas:

$$\begin{cases} U_{out}(x, y) = [U_{in}(x, y) - U_{offset}] * [sf(x, y)]^{\frac{1}{\gamma}} + U_{offset} \\ V_{out}(x, y) = [V_{in}(x, y) - V_{offset}] * [sf(x, y)]^{\frac{1}{\gamma}} + V_{offset} \end{cases},$$

$$\text{where } sf(x, y) = \frac{Y_{out}(x, y) - Y_{offset}}{Y_{in}(x, y) - Y_{offset}}$$

wherein $\gamma$ represents the compensation factor, $U_{in}$, $V_{in}$, and $Y_{in}$ represent the original input pixel data, $U_{out}$, $V_{out}$, and $Y_{out}$ represents the output pixel data, and $U_{offset}$, $V_{offset}$, and $Y_{offset}$ represent offset values.

16. The method of claim 11, wherein generating the tone mapping LUT for each sub-region comprises:
generating an initial LUT for each sub-region based on the local luminance histogram for the sub-region; and
for each sub-region, computing a weighted average of the sub-region's initial LUT and the initial LUTs of neighboring sub-regions.

17. The method of claim 11, wherein generating the tone mapping LUT for each sub-region comprises:
generating an initial LUT for each sub-region based on the local luminance histogram for the sub-region; and
for each sub-region, computing a weighted average of the global tone mapping curve, the sub-region's initial LUT, and the initial LUTs of neighboring sub-regions.

18. The method of claim 11, wherein computing the global tone mapping curve is based further on a boost factor selected by a user of the electronic device.

19. The method of claim 11, wherein determining the output luminance value for each pixel comprises performing linear interpolation between entry points of the LUT generated for the pixel's sub-region.

20. The method of claim 11, wherein sending the modified frame of video to an output device comprises sending the modified frame of video to a display device to be rendered.

21. At least one non-transitory machine-readable medium having instructions stored therein that, in response to being executed on a computing device, cause the computing device to:
receive a frame of video, wherein the frame comprises a plurality of pixels segmented into a plurality of sub-regions, each pixel comprising an input luminance value;
generate a local luminance histogram for each sub-region of the plurality of sub-regions;
generate a global luminance histogram for the entire frame of video and generate a global tone mapping curve based on the global luminance histogram;
generate a tone mapping LUT for each sub-region based on the global tone mapping curve and the corresponding local luminance histogram for the sub-region;
modify the frame of video by determining an output luminance value for each pixel by looking up the input luminance value of the pixel in the tone mapping LUT generated for the pixel's sub-region; and
send the modified frame of video to an output device.

22. The non-transitory machine-readable medium of claim 21, wherein the instructions cause the computing device to further modify the frame of video by adjusting chrominance values of each pixel based on a difference between the input luminance value of the pixel and the output luminance value of the pixel.

23. The non-transitory machine-readable medium of claim 22, wherein to adjust the chrominance values of each pixel is further based on a color compensation factor selected by a user of the computing device.

24. The non-transitory machine-readable medium of claim 21, wherein to generate the tone mapping LUT for each sub-region, the instructions cause the computing device to:
generate an initial LUT for each sub-region based on the local luminance histogram for the sub-region; and
for each sub-region, compute a weighted average of the sub-region's initial LUT and the initial LUTs of neighboring sub-regions.

25. The electronic device of claim 21, wherein to generate the tone mapping LUT for each sub-region, the instructions cause the computing device to:
generate an initial LUT for each sub-region based on the local luminance histogram for the sub-region; and
for each sub-region, compute a weighted average of the global tone mapping curve, the sub-region's initial LUT, and the initial LUTs of neighboring sub-regions.

* * * * *